US006635593B1

(12) United States Patent
Kukino et al.

(10) Patent No.: US 6,635,593 B1
(45) Date of Patent: Oct. 21, 2003

(54) HIGH STRENGTH SINTERED IMPACT HAVING EXCELLENT RESISTANCE TO CRATERING

(75) Inventors: Satoru Kukino, Itami (JP); Tomohiro Fukaya, Itami (JP); Junichi Shiraishi, Itami (JP); Tetsuo Nakai, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/913,265

(22) PCT Filed: Feb. 10, 2000

(86) PCT No.: PCT/JP00/00723

§ 371 (c)(1), (2), (4) Date: Aug. 10, 2001

(87) PCT Pub. No.: WO00/47537

PCT Pub. Date: Aug. 17, 2000

(30) Foreign Application Priority Data

Feb. 12, 1999 (JP) ............................................ 11-34749

(51) Int. Cl.[7] ............................................ C04B 35/5831

(52) U.S. Cl. ........................ 501/96.4; 301/87; 301/96.1; 301/96.3; 407/119; 428/698

(58) Field of Search ........................ 501/96.4, 87, 96.1, 501/96.3; 407/119; 428/698

(56) References Cited

U.S. PATENT DOCUMENTS 5,092,920 A * 3/1992 Nakai et al. .................. 501/87
5,200,372 A * 4/1993 Kuroyama et al. ........ 501/96.4
5,466,642 A * 11/1995 Tajima et al. .............. 501/96.4
5,569,862 A * 10/1996 Kuroyama et al. ........ 501/96.4
6,001,758 A * 12/1999 Fukaya et al. ............. 501/96.4
6,008,153 A * 12/1999 Kukino et al. ............. 501/96.4
6,140,262 A * 10/2000 Collier et al. .............. 501/96.4
6,316,094 B1 * 11/2001 Fukaya et al. .............. 428/323

FOREIGN PATENT DOCUMENTS

EP 0373609 A1 12/1989
EP 0386338 A1 12/1989
EP 0709353 A2 10/1995
JP 58-164750 * 9/1983
JP 62-25630 6/1987
JP 62-25631 6/1987
JP 63-176367 7/1988
JP 1-96084 * 4/1989
JP 2-167606 6/1990
JP 5-186272 7/1993
JP 7-82031 3/1995

* cited by examiner

*Primary Examiner*—Karl Group
(74) *Attorney, Agent, or Firm*—McDermott, Will & Emery

(57) ABSTRACT

A sintered material containing high-pressure phase-type boron nitride and a binder is provided. The high-pressure phase-type boron nitride is contained in an amount of from 50% to 78% by volume, and the balance is a binder phase. The binder phase comprises at least one selected from the group consisting of nitride, carbide, carbonitride, and boride of Ti, nitride, boride and oxide of Al, carbide and boride of W, nitride, carbide, carbonitride and boride of Co, and carbide and boride of Ni, or a mutual solid solution thereof. The binder phase forms a binder phase which is continuous in a sintered material texture. The weight of metal components Al, W, Co and Ni which are present as compounds in the sintered material is from 3% to 20% based on the sintered material. The sintered material is excellent in crater resistance and capable of realizing a long tool life, even under the condition that the temperature of the cutting edge becomes high and the impact is large, as in high-speed interrupted cutting of hardened steel where the cutting speed V becomes at least 150 m/min.

4 Claims, 1 Drawing Sheet

W
0.9
0.8
0.7
0.6
0.5
0.4
0.3
0.2
0.1
$\frac{W}{W+Co+Ni}$
Co 0.9 0.8 0.7 0.6 0.5 0.4 0.3 0.2 0.1 Ni
$\frac{Co}{Co+Ni}$

HIGH STRENGTH SINTERED IMPACT HAVING EXCELLENT RESISTANCE TO CRATERING

FIELD OF THE INVENTION

The present invention relates to a highly crater-resistant, high-strength sintered material and sintered body. Particularly, it relates to a high pressure phase-type boron nitride-based sintered material for cutting tools, having improved wear resistance and toughness.

RELATED ART

A high pressure phase-type boron material, a typical example of which is cubic boron nitride (hereafter referred to as "cBN"), is a highly hard substance next to diamond in hardness. A cBN-based sintered material is used for various cutting tools, wear-resistant parts, impact-resistant parts and the like.

In this type of the sintered material, the compatibility between hardness and strength is difficult. As techniques aiming at this compatibility, mentioned are, for example, JP-B-62-25630, JP-B-62-25631 and JP-A-05-186272. These documents describe that the sintered materials disclosed are excellent in failure resistance and exhibit excellent performances in interrupted cutting of hardened steel, and that the cutting conditions are so limited that the cutting speed V is at most about 100 m/min.

If the above-mentioned sintered materials are used under the conditions that the temperature of the cutting edge is high and the impact is large, as in high-speed interrupted cutting of hardened steel at a cutting speed V of at least 150 m/min, the development of crater wear and the generation of cracks at a crater portion are observed, resulting in a failure with a short tool life.

SUMMARY OF THE INVENTION

Accordingly, a main object of the present invention is to provide a sintered material which is excellent in crater resistance and exhibits a long tool life even under such conditions that the temperature of the cutting edge becomes high and the impact is large, as in high-speed interrupted cutting of hardened steel.

The highly crater-resistant, high strength sintered material according to the present invention is a highly crater-resistant high-strength sintered material comprising high-pressure phase-type boron nitride and a binder. The high-pressure phase-type boron nitride is contained in an amount of from 50% to 78% by volume based on the sintered material, and the balance comprises a binder phase. The binder phase comprises at least one selected from the group consisting of nitrides, carbides, carbonitrides and borides of Ti, nitrides, borides and oxides of Al, carbides and borides of W, nitrides, carbides, carbonitrides and borides of Co, and carbides and borides of Ni, and/or mutual solid solutions thereof. The binder phase is continuous in a sintered material texture. The amount of the metal components Al, W, Co and Ni which exist as the compounds in the sintered material are from 3 to 20% by weight based on the sintered material. These compounds constitute the binder phase. The sintered material according to the present invention, of course, may contain unavoidable impurities.

DETAILED EXPLANATION OF THE INVENTION

Figure 1:
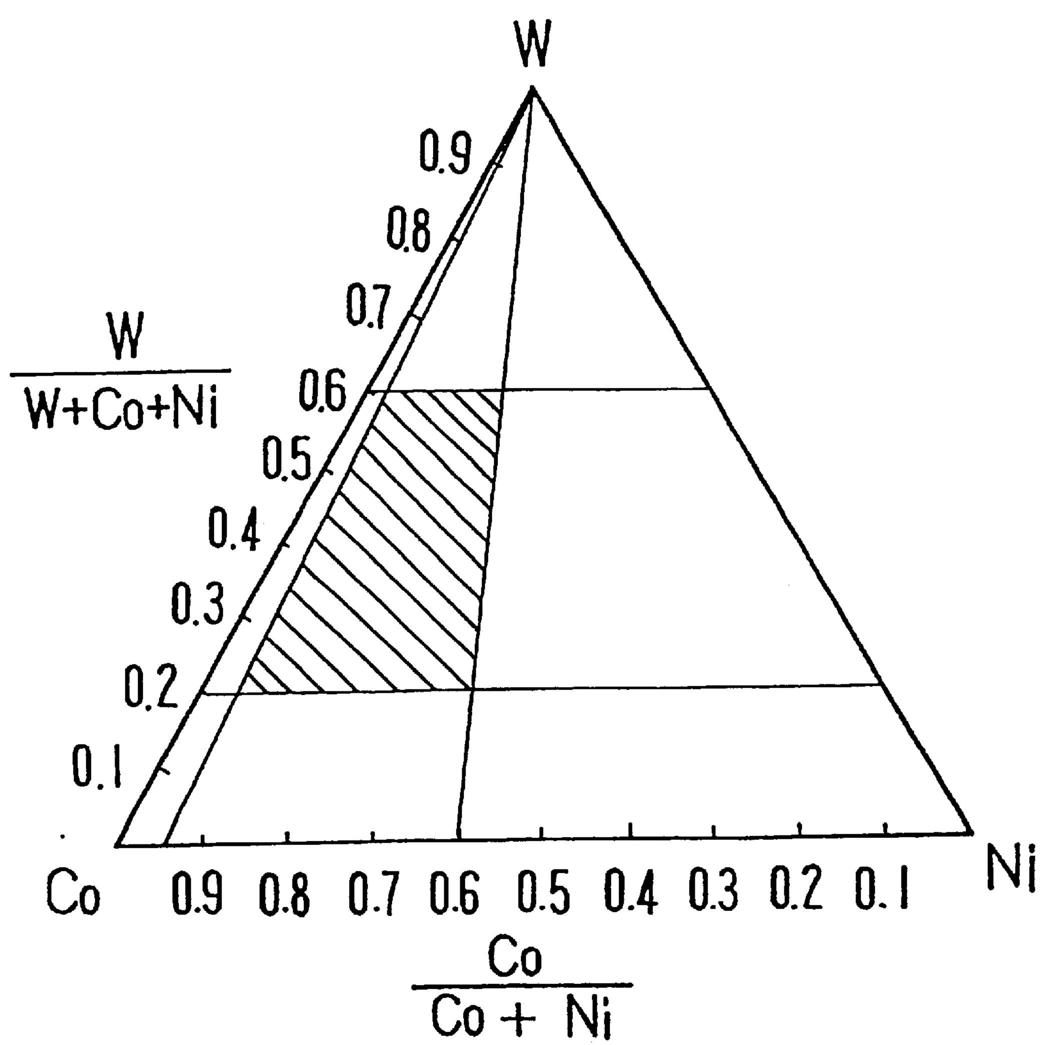
FIG. 1 is a graph illustrating ranges of a weight ratio, [W/(W+Co+Ni)] and a weight ratio, [Co/(Co+Ni)] which are excellent in strength and heat resistance.

For use in which the temperature of the cutting edge becomes high and the impact is large to cause the development of crater wear, the generation of cracks at crater portions and the failure, as in the high-speed interrupted cutting conducted by using hardened steel, it seems that the strength of the binder phase decreases due to the high temperature, and small cracks generated in the binder phase and small cracks generated at the interface between the high-pressure phase-type boron nitride and the binder phase are caused due to an impact to the cutting edge, and these cracks grow and develop due to the impact to cause failure or breakage of the cutting edge.

The amount of the high-pressure phase-type boron nitride is from 50% to 78% by volume, for example from 60 to 75% by volume, particularly from 63 to 72% by volume, based on the sintered material. If the amount is less than 50% by volume, the hardness of the sintered material is small, the characteristics of the high-pressure phase-type boron nitride-based sintered material are weakened so that the tool life is short. If the amount is larger than 78% by volume, the amount of the binder phase decreases, and the bond strength between the high-pressure phase-type boron nitride and the binder phase is weak, and then the strength of the sintered material is decreased.

The binder phase comprises at least one selected from the group consisting of nitride, carbide, carbonitride and boride of Ti, nitride, boride and oxide of Al, carbide and boride of W, nitride, carbide, carbonitride and boride of Co, and carbide and boride of Ni, and/or a mutual solid solution thereof. The binder phase is continuous in a sintered material texture.

The binder phase having said composition has a high strength in the use in which a hard impact is applied at a high temperature, and such binder phase has a high bond strength to the high-pressure phase-type boron nitride, giving high strength of the sintered material. It seems that when the binder phase is subjected to an impact at a high temperature, the generation of small cracks is poor and the cracks do not easily develop in the binder phase. Because the binder phase is continuous, the bond strength between the high pressure phase-type boron nitride and the binder phase and the force for retaining the high pressure phase-type boron nitride become higher.

The total amount of metal components Al, W, Co and Ni which are present in the form of compounds in the sintered material is from 3% to 20% by weight, for example from 5% to 15% by weight, particularly from 5% to 12% by weight, based on the sintered material. The compounds comprising Al, Co and/or Ni are originally contained in the binder or are generated by the reaction between the high pressure phase-type born nitride and the metal components contained in the binder during the sintering step for preparing the sintered material. These compounds have the effect of improving the strength of the interface between the high pressure phase-type boron nitride and the binder phase and the effect of improving the strength of the binder.

If the amount of the Al, W, Co and Ni metal components in these compounds is smaller than 3% by weight, the above effects are little so that the strength of the sintered material is low. If the weight is larger than 20% by weight, the heat resistance of the sintered body is undesirably low.

The amount of an Al metal component which is present as a compound in the sintered material is preferably from 2% to 10% by weight, for example from 4% to 8% by weight, based on the sintered material. Al has a high reactivity with particularly the high pressure phase-type boron nitride so that Al has a high effect of improving the bond strength. Because Al is an element which is easily oxidized, the generation of $Al_2O_3$ is sometimes observed in the sintered material.

The total amounts of the metal components W, Co and Ni which are present in the form of compounds in the sintered material is preferably from 1% to 10% by weight, for example from 5 to 7% by weight, based on the sintered material. It seems that W, Co and Ni react with the high pressure phase-type boron nitride and other substances to increase the bond strength and to give a solid solution in nitride, carbide and carbonitride of Ti so that the binder phase is strengthened.

A weight ratio of W, Co, and Ni is preferably such that [W/(W+Co+Ni)] is within a range from 0.2 to 0.6, for example from 0.2 to 0.4, and/or [Co/(Co+Ni)] is within a range from 0.6 to 0.95, for example from 0.75 to 0.95. It is supposed that, depending on the weight ratio of W, Co and Ni, the compounds of W, Co and Ni generated in the sintered material are varied so that the strength and heat resistance of the sintered material are varied. When the amounts of W, Co and Ni are in the range shown by the hatched region in FIG. 1, the strength and thermal resistance of the sintered material are more excellent.

W, Co, Ni, WC and the like include immixture ingredients which is separated from a super hard alloy ball during the mixing and milling processes. Therefore, the amounts of the immixture ingredients can be expected because such amounts are proportional to the time of mixing and milling. The sintered material according to the present invention can be obtained by adding the shortage amounts of, in the form of powder, said metals for giving target amounts.

The high-pressure phase-type boron nitride is preferably coated with a coating substance, particularly with an inorgaic material. The coating substance preferably comprises at least one selected from the group consisting of nitrides and borides of Ti and nitrides and borides of Al, and/or mutual solid solutions thereof. The thickness of the coating may be from 1 nm to 500 nm, for example from 10 nm to 100 nm. The coating can be formed by using a chemical vapor deposition (CVD), a physical vapor deposition (PVD), a non-electrolytic plating and like. It is believed that said coating substance has an effect of increasing the bond strength between the high-pressure phase-type boron nitride and the binder phase.

The sintered material preferably has, in an arbitrary or any region containing at least 100 particles of high-pressure phase-type boron nitride, a texture where a proportion of the number of high-pressure phase-type boron nitride particles which are mutually in direct contact is from 0.1% to 20%, for example from 0.2% to 10%.

The sintered material can be prepared by mixing the powdery binder and the cBN powder and pressurizing the mixture at a pressure of 3 to 10 GPa and a temperature of 700 to 2,000° C. for 10 to 120 minutes by means of a super high pressure apparatus.

PREFERRED EMBODIMENTS OF THE INVENTION

Hereafter, the present invention will be illustrated by showing Examples.

EXAMPLE 1

Powder of carbide, nitride and/or carbonitride of Ti shown in Table 1 was mixed with Al powder, and the mixture was placed in a vacuum furnace at 1,000° C. for 30 minutes. The mixture was milled by means of a ball mill to give a powdery binder.

The powdery binder was examined by XRD (X-ray diffraction), whereby carbide and nitride of Ti, $Ti_2AlN$, $TiAl_3$ and TiAl were detected. The powdery binder had the same composition as that of the charged powdery raw materials.

This binder was mixed with cBN powder having an average particle size of 4.3 $\mu$m, W powder, WC powder, Co powder and/or Ni powder in various blending ratios, and the mixture was placed in the vacuum furnace at 1,000° C. for 20 minutes, followed by degassing. The resultant powder mixture was sintered under conditions having a pressure of 4.5 GPa and a temperature of 1,400° C. for 30 minutes.

The sintered material thus obtained was examined by XRD (X-ray diffraction). The detected compounds are shown in Table 1. Further, the results of wt % of the metal components Al, W, Co and Ni which are present as compounds in the sintered material, measured by an atomic emission spectroscopy and the % by volume, based on the sintered material, of cBN are shown in Table 1. The observation of texture of these sintered materials indicated that the binder phase is continuous. The wording "binder phase is continuous" in the context of the present Description means that cBN grains are maintained by the binder phase. In other words, said wording means that the original shape of the sintered body cannot be maintained when the binder phase is removed by means of fluoronitric acid in a tightly closed vessel having no evaporation of the acid.

Then, this sintered material was worked to give a tool (ISO number: SNGN 160408), and a tool life until failure in the high-speed interrupted cutting of hardened steel was examined under the following conditions. The results are shown in Table 1.

Matter to be cut carburized steel SCM415, HRC61 120 mm (diameter)× 280 mm (length), with six V-shaped grooves in the axial direction of the matter to be cut Cutting conditions cutting speed: cutting speed V=205 m/min, depth of cut: d=0.295 mm, feeding: f=0.115 mm/rev, DRY

TABLE 1

| No. | Binder | | vol % of cBN | Compounds dectected by XRD of sintered material | wt % of Al, W, Co and Ni in sintered material | Failure tool life (min) |
|---|---|---|---|---|---|---|
| 1-1 | $TiN_{0.6}$<br>Al | 90 wt %<br>10 wt % | 59 | cBN, TiN, $TiB_2$, $AlB_2$, $Al_2O_3$, $W_2CO_{21}B_6$, $Co_2B$ | 9 | 36 |
| 1-2 | $TiC_{0.7}$<br>Al | 90 wt %<br>10 wt % | 72 | cBN, TiC, $TiB_2$, AlN, $AlB_2$, $Al_2O_3$, $W_2CO_{21}B_6$, $Co_2B$ | 5 | 38 |
| 1-3 | $Ti(CN)_{0.6}$<br>Al | 85 wt %<br>15 wt % | 51 | cBN, TiCN, $TiB_2$, AlN, $AlB_2$, $Al_2O_3$, $W_2Co_{21}B_6$, $Co_2B$ | 13 | 31 |
| 1-4 | $TiN_{0.7}$<br>Al | 92 wt %<br>8 wt % | 77 | cBN, TiN, $TiB_2$, AlN, $AlB_2$, $Al_2O_3$, $W_2B_5$, $Co_2B$, $Co_2N$, $Ni_2B$ | 6 | 35 |
| 1-5 | $TiC_{0.8}$<br>Al | 90 wt %<br>10 wt % | 67 | cBN, TiC, $TiB_2$, AlN, $AlB_2$, $Al_2O_3$, $W_2Co_{21}B_6$, $Co_2C$, $Ni_3C$ | 12 | 33 |

TABLE 1-continued

| No. | Binder | | vol % of cBN | Compounds dectected by XRD of sintered material | wt % of Al, W, Co and Ni in sintered material | Failure tool life (min) |
|---|---|---|---|---|---|---|
| 1-6 | $TiN_{0.7}$<br>Al | 60 wt %<br>20 wt % | 58 | cBN, TiN, $TiB_2$, AlN, $AlB_2$, $Al_2O_3$, $W_2Co_{21}B_6$, $Co_2B$ | 14.9 | 30 |
| 1-7 | $TiN_{0.7}$<br>Al | 95 wt %<br>5 wt % | 64 | cBN, TiN, $TiB_2$, AlN, $AlB_2$, $Al_2O_3$, $W_2Co_{21}B_6$, $Co_2B$ | 3 | 29 |
| 1-8 | $TiN_{0.8}$<br>Al | 95 wt %<br>5 wt % | 67 | cBN, TiN, $TiB_2$, AlN, $AlB_2$, $Al_2O_3$, $W_2Co_{21}B_6$, $Co_2B$ | 2.8 | 3 |
| 1-9 | $TiN_{0.7}$<br>Al | 65 wt %<br>35 wt % | 67 | cBN, TiN, $TiB_2$, AlN, $AlB_2$, $Al_2O_3$, $W_2Co_{21}B_6$, $Co_2B$ | 20.2 | 9 |

As is apparent from Table 1, the sample No. 1-8 in which the content of the metal components Al, W. Co and Ni is less than 3%, and the sample No. 1-9 in which such a content exceeds 20% have a very short tool life until failure.

EXAMPLE 2

80% by weight of Ti nitride powder, 10% by weight of Al powder, 6% by weight of eutectic WC-Co powder, 2% by weight of Co powder and 2% by weight of Ni powder were mixed, and the mixture was placed in a vacuum furnace at 1,020° C. for 32 minutes. The mixture was milled by means of a ball mill to give a powdery binder. This binder was mixed with cBN powder having an average particle size of 3.9 $\mu$m in various blending ratios to give the cBN content of the vol % shown in Table 2. The mixture was placed in the vacuum furnace at 980° C. for 21 minutes, followed by degassing. The resultant powder mixture was sintered under conditions having a pressure of 4.8 GPa and a temperature of 1,380° C. for 15 minutes.

The amount of Al in these sintered materials was from 2% to 10% by weight, based on the sintered materials. The sum of W, Co and Ni in the sintered material was from 1% to 10% by weight, based on the sintered material. The weight ratio of W to W, Co and Ni: [W/(W+Co+Ni)] was from 0.2 to 0.6, and the weight ratio of Co to Co and Ni: [Co/(Co+Ni)] was from 0.6 to 0.95.

Then, this sintered material was worked to give a tool (ISO number: CNMA 160412), and the tool tool life until failure in the high-speed interrupted cutting of hardened steel was examined under the following conditions. The results are shown in Table 2.

Matter to be cut carburized steel SCr420, HRC60 110 mm (diameter)×290 mm(length), with four U-shaped grooves in the axial direction of the matter to be cut Cutting conditions cutting speed: V=195 m/min, depth of cut: d=0.198 mm, feeding: f=0.106 mm/rev, DRY

TABLE 2

| No. | vol % of cBN | Failure tool life (min) |
|---|---|---|
| 2-1 | 45 | 6 |
| 2-2 | 50 | 23 |
| 2-3 | 60 | 27 |
| 2-4 | 63 | 32 |
| 2-5 | 70 | 32 |
| 2-6 | 72 | 32 |
| 2-7 | 75 | 29 |
| 2-8 | 77.9 | 27 |
| 2-9 | 80 | 2 |

As is apparent from Table 2, both of the sample No. 2-1 having a smaller content of cBN and the sample No. 2-9 having a larger content of cBN have a very short failure tool life.

EXAMPLE 3

Ti nitride powder and Al powder shown in Table 3 were mixed in various blending ratios, and the mixture was placed in a vacuum furnace at 976° C. for 34 minutes. The mixture was milled by means of a ball mill to give a powdery binder. The powdery binder had the same composition as that of the charged powdery raw materials.

This binder was mixed with cBN powder having an average particle size of 2.8 $\mu$m, eutectic WC-Co powder, Co powder and Ni powder in various blending ratios so that the content of cBN was 60% by volume, based on the sintered material, and the mixture was placed in the vacuum furnace at 962° C. for 26 minutes, followed by degassing. The resultant powder mixture was sintered under conditions having a pressure of 4.7 GPa and a temperature of 1,420° C. for 10 minutes.

The results of measurement of wt % of the metal component of Al which is present as a compound in the sintered material by an atomic emission spectroscopy are shown in Table 3. The amount of the components Al, W, Co and Ni was from 3% to 20% by weight, based on the sintered material.

The wt % of the sum of W, Co and Ni in the sintered material was from 1% to 10%. The weight ratio of W to W, Co and Ni: [W/(W+Co+Ni)] was from 0.2 to 0.6, and the weight ratio of Co to Co and Ni: [Co/(Co+Ni)] was from 0.6 to 0.95.

Then, this sintered material was worked to give a tool (ISO number: TNMA 120408), and the tool life until failure in the high-speed interrupted cutting of hardened steel was examined under the following conditions. The results are shown in Table 3.

Matter to be cut carburized steel SNCM420, HRC59 115 mm (diameter)×315 mm (length), with eight V-shaped grooves in the axial direction of the matter to be cut Cutting conditions cutting speed: V=212 m/min, depth of cut: d=0.235 mm, feeding: f=0.123 mm/rev, DRY

TABLE 3

| No. | Binder | | wt % of Al in sintered material | Failure tool life (min) |
|---|---|---|---|---|
| 3-1 | $TiN_{0.6}$<br>Al | 96 wt %<br>4 wt % | 1.5 | 17 |

TABLE 3-continued

| No. | Binder | | wt % of Al in sintered material | Failure tool life (min) |
|---|---|---|---|---|
| 3-2 | $TiN_{0.6}$<br>Al | 95 wt %<br>5 wt % | 2 | 21 |
| 3-3 | $TiN_{0.8}$<br>Al | 90 wt %<br>10 wt % | 4 | 24 |
| 3-4 | $TiN_{0.7}$<br>Al | 87 wt %<br>13 wt % | 6 | 28 |
| 3-5 | $TiN_{0.6}$<br>Al | 82 wt %<br>18 wt % | 8 | 24 |
| 3-6 | $TiN_{0.7}$<br>Al | 77 wt %<br>23 wt % | 9.9 | 22 |
| 3-7 | $TiN_{0.6}$<br>Al | 70 wt %<br>30 wt % | 12 | 19 |

As is apparent from Table 3, tool life until failure is longer when the amount of Al is in the range of from 2% to 10% by weight.

EXAMPLE 4

80% by weight of Ti nitride powder and 20% by weight of Al powder were mixed, and the mixture was placed in a vacuum furnace at 1,012° C. for 30 minutes. The mixture was milled by means of a ball mill to give a powdery binder. The powdery binder was examined by XRD (X-ray diffraction), whereby carbide and nitride of Ti, $Ti_2AlN$, $TiAl_3$ and TiAl were detected.

This binder was mixed with cBN powder having an average particle size of 4.6 μm, W powder, WC powder, Co powder and Ni powder in various blending ratios so that the content of cBN was 62% by volume based on the sintered material, and the mixture was placed in the vacuum furnace at 987° C. for 29 minutes, followed by degassing. The resultant powder mixture was sintered under conditions having a pressure of 4.6 GPa and a temperature of 1,390° C. for 30 minutes.

The results of measurement of wt %, based on the sintered material, of the metal components W, Co and Ni which are present as compounds (each element type and the amounts sum of elements) in the sintered material by means of an atomic emission spectroscopy, the weight ratio of W to W, Co and Ni, that is, [W/(W+Co+Ni)], and the weight ratio of Co to Co and Ni, that is, [Co/(Co+Ni)] are shown in Table 4.

The amount of the components Al was from 2% to 10% by weight, based on the sintered material. The amount of the components Al, W, Co and Ni was from 3% to 20% by weight, based on the sintered material.

Then, this sintered material was worked to give a tool (ISO number: SNGN 160408), and the tool life until failure in the high-speed interrupted cutting of hardened steel was examined under the following conditions. The results are shown in Table 4.

Matter to be cut p1 carburized steel SCM415, HRC61 95 mm (diameter)×185 mm (length), with four V-shaped grooves in the axial direction of the matter to be cut Cutting conditions cutting speed: V=194 m/min, depth of cut: d=0.268 mm, feeding: f=0.097 mm/rev, DRY

TABLE 4

| No. | wt % of the sum of W, Co and Ni | W/(W + Co + Ni weight ratio | Co/(Co + Ni) weight ratio | W wt % | Co wt % | Ni wt % | Failure tool life (min) |
|---|---|---|---|---|---|---|---|
| 4-1 | 0.5 | 0.4 | 0.75 | 0.2 | 0.225 | 0.075 | 19 |
| 4-2 | 1 | 0.4 | 0.75 | 0.4 | 0.45 | 0.15 | 25 |
| 4-3 | 3 | 0.4 | 0.75 | 1.2 | 1.35 | 0.45 | 28 |
| 4-4 | 5 | 0.5 | 0.75 | 2.5 | 1.875 | 0.625 | 35 |
| 4-5 | 7 | 0.4 | 0.75 | 2.8 | 3.15 | 1.05 | 32 |
| 4-6 | 9.9 | 0.4 | 0.75 | 3.96 | 4.455 | 1.485 | 29 |
| 4-7 | 11 | 0.4 | 0.75 | 4.4 | 4.95 | 1.65 | 20 |
| 4-8 | 8 | 0.65 | 0.95 | 5.2 | 2.66 | 0.14 | 19 |
| 4-9 | 8 | 0.65 | 0.75 | 5.2 | 2.1 | 0.7 | 17 |
| 4-10 | 8 | 0.65 | 0.6 | 5.2 | 1.68 | 1.12 | 20 |
| 4-11 | 8 | 0.6 | 0.97 | 4.8 | 3.104 | 0.096 | 19 |
| 4-11 | 8 | 0.6 | 0.95 | 4.8 | 3.04 | 0.16 | 21 |
| 4-13 | 8 | 0.6 | 0.75 | 4.8 | 2.4 | 0.8 | 25 |
| 4-14 | 8 | 0.6 | 0.6 | 4.8 | 1.92 | 1.28 | 26 |
| 4-15 | 8 | 0.6 | 0.55 | 4.8 | 1.76 | 1.44 | 17 |
| 4-16 | 8 | 0.4 | 0.97 | 3.2 | 4.656 | 0.114 | 18 |
| 4-17 | 8 | 0.4 | 0.95 | 3.2 | 4.56 | 0.24 | 25 |
| 4-18 | 8 | 0.4 | 0.75 | 3.2 | 3.6 | 1.2 | 26 |
| 4-19 | 8 | 0.4 | 0.6 | 3.2 | 2.88 | 1.92 | 22 |
| 4-20 | 8 | 0.4 | 0.55 | 3.2 | 2.64 | 2.16 | 15 |
| 4-21 | 8 | 0.2 | 0.97 | 1.6 | 6.208 | 0.192 | 20 |
| 4-22 | 8 | 0.2 | 0.95 | 1.6 | 6.08 | 0.32 | 26 |
| 4-23 | 8 | 0.2 | 0.75 | 1.6 | 4.8 | 1.6 | 28 |
| 4-24 | 8 | 0.2 | 0.6 | 1.6 | 3.84 | 2.56 | 24 |
| 4-25 | 8 | 0.2 | 0.55 | 1.6 | 3.52 | 2.88 | 20 |
| 4-26 | 8 | 0.15 | 0.95 | 1.2 | 6.46 | 0.34 | 17 |
| 4-27 | 8 | 0.15 | 0.75 | 1.2 | 5.1 | 1.7 | 18 |
| 4-28 | 8 | 0.15 | 0.6 | 1.2 | 4.08 | 2.72 | 19 |

As is shown in Table 4, when the content of sum of W+Co+Ni is from 1% to 10% by weight, when the weight ratio [W/(W+Co+Ni)] is from 0.2 to 0.6, and when the weight ratio [Co/(Co+Ni)] is from 0.6 to 0.95, the tool life until failure is longer.

EXAMPLE 5

75% by weight of Ti nitride, 15% by weight of Al powder, 3% by weight of WC powder, 5% by weight of Co powder and 2% by weight of Ni powder were mixed, and the mixture was placed in a vacuum furnace at 1,000° C. for 30 minutes. The mixture was milled by means of a ball mill to give a powdery binder.

This powdery binder was mixed with cBN powder having an average particle size of 4.3 μm and coated with nitride or boride of Ti, nitride or boride of Al, or a mutual solid solution thereof shown in Table 5 were mixed so that the cBN content was 63% by volume based on a sintered material, and the mixture was placed in the vacuum furnace at 1,000° C. for 20 minutes, followed by degassing. The coating was performed with the use of an RF sputtering PVD apparatus, and the film thickness of each coating layer was from 10 nm to 100 nm. The resultant powder mixture was sintered under conditions having a pressure of 4.5 GPa and a temperature of 1,400° C.

The resultant sintered materials were analyzed by AES (Auger Electron Spectroscopy) to measure a contact ratio among the cBN particles. The measurement was carried out by calculating the rate of the number of particles that are in contact with other CBN particles in an arbitrary region containing at least 100 cBN particles.

In these sintered materials, the amount of Al in the sintered material was from 2% to 10% by weight, based on the sintered material. The amount of the sum of W, Co and Ni in the sintered material was from 1% to 10% by weight, based on the sintered material. The weight ratio of W to W, Co and Ni, that is, [W/(W+Co+Ni)] was from 0.2 to 0.6, and the weight ratio of Co to Co and Ni, that is, [Co/(Co+Ni)] was from 0.6 to 0.95.

Then, the sintered material was worked to give a tool (ISO number: SNGN 160408), and the tool life until failure in the high-speed interrupted cutting of hardened steel was measured under the following conditions. The results are shown in Table 5.

Matter to be cut carburized steel SCM440, HRC62 135 mm (diameter)× 265 mm (length), with six U grooves in the axial direction of the matter to be cut Cutting conditions cutting speed: V=186 m/min, depth of cut: d=0.195 mm, feeding: f=0.105 mm/rev, DRY The results of commercially available sintered materials manufactured without coating are also shown in Table 5 for comparisons.

TABLE 5

| No. | Coating sub-stance | Coating thickness (nm) | Contact ratio of cBN particles (%) | Failure tool life (min) |
|---|---|---|---|---|
| 5-1 | TiN | 100 | 15 | 45 |
| 5-2 | AlN | 90 | 0.2 | 48 |
| 5-3 | $TiB_2$ | 95 | 19.9 | 46 |
| 5-4 | TiAlN | 100 | 10 | 49 |
| 5-5 | $AlB_2$ | 95 | 8 | 44 |
| 5-6 | None | — | 22 | 40 |
| 5-7 | None | — | 50 | 35 |

As is shown in Table 5, it is understood that the commercially available sintered materials which do not have a coating and have more than 20% of the cBN particle contact rate have a short failure tool life.

EFFECTS OF THE INVENTION

As described above, the sintered material according to the present invention is excellent in crater resistance and capable of realizing a long tool life even under the condition that the temperature of the cutting edge becomes high and the impact is large, as in high-speed interrupted cutting of hardened steel where the cutting speed V is at least 150 m/min.

What is claimed is:

1. A highly crater-resistant high-strength sintered material comprising from 50% to 78% by volume of high-pressure phase-type boron nitride and the balance of a binder phase, wherein said binder phase comprises at least one component selected from the group consisting of nitride, carbide, carbonitride and boride of Ti, nitride, boride and oxide of Al, carbide and boride of W, nitride, carbide, carbontride and boride of Co, carbide and boride of Ni, and mutual solid solutions thereof;

said binder phase is continuous in a sintered material texture;

a total weight of Al, W, Co and Ni which are present as compounds in the sintered material is from 3% to 20% by weight based on the sintered material; and a weight of of W, Co and Ni which are present as compounds in the sintered material is from 1% to 10% based on the sintered material; and a weight ratio of W, Co and Ni in such that [W/(W+Co+Ni)] is within a range from 0.2 to 0.6 and [Co/(Co+Ni)] is within a range from 0.6 to 0.95.

2. The highly crater-resistant high-strength sintered material as set forth in claim 1, wherein a weight of the Al component which is present as a compound in the sintered material is from 2% to 10% by weight based on the sintered material.

3. The highly crater-resistant high-strength sintered material as set forth in claims 1 or 2, wherein the high-pressure phase-type boron nitride is coated with a coating substance, and the coating substance comprises at least one component selected from the group consisting of nitride and boride of Ti and nitride and boride of A, and mutual solid solutions thereof.

4. The highly crater-resistant high-strength sintered material as set forth in claims 1 or 2, which comprises, in an arbitrary region containing at least 100 particles of the high-pressure phase-type boron nitride, a texture where a proportion of the number of high-pressure phase-type boron nitride particles which are mutually in direct contact is from 01.% to 20%.

* * * * *